(12) United States Patent
Joshi

(10) Patent No.: US 10,065,544 B2
(45) Date of Patent: Sep. 4, 2018

(54) VEHICLE SEAT WITH THERMAL DEVICE

(71) Applicant: Faurecia Automotive Seating, LLC, Auburn Hills, MI (US)

(72) Inventor: Raghvendra T Joshi, Windsor (CA)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 149 days.

(21) Appl. No.: 15/145,852

(22) Filed: May 4, 2016

(65) Prior Publication Data

US 2016/0325655 A1 Nov. 10, 2016

Related U.S. Application Data

(60) Provisional application No. 62/158,026, filed on May 7, 2015.

(51) Int. Cl.
*B60N 2/56* (2006.01)
*B60H 1/00* (2006.01)

(52) U.S. Cl.
CPC ....... *B60N 2/5657* (2013.01); *B60H 1/00285* (2013.01); *B60N 2/5642* (2013.01); *B60N 2/5692* (2013.01)

(58) Field of Classification Search
CPC .. B60N 2/5657; B60N 2/5692; B60N 2/5642; B60N 2/565; B60H 1/00285
USPC ........................................ 297/180.13, 180.14
See application file for complete search history.

(56) References Cited

U.S. PATENT DOCUMENTS

| 2006/0060344 | A1* | 3/2006 | Esaki | B60H 1/00285 165/287 |
| 2009/0000311 | A1* | 1/2009 | Kmetz | B60H 1/00478 62/3.61 |
| 2012/0129439 | A1* | 5/2012 | Ota | B60H 1/242 454/120 |
| 2016/0280038 | A1* | 9/2016 | Tanaka | B60H 1/00285 |

* cited by examiner

*Primary Examiner* — Milton Nelson, Jr.
(74) *Attorney, Agent, or Firm* — Barnes & Thornburg LLP

(57) ABSTRACT

A passenger restraint includes a vehicle seat and a foundation adapted to couple the seat to a vehicle frame included in a vehicle. The vehicle seat is adapted to support a passenger sitting thereon. The foundation couples the vehicle seat in spaced-apart relation to the vehicle frame to allow the vehicle seat to move back and forth relative to the vehicle frame.

12 Claims, 9 Drawing Sheets

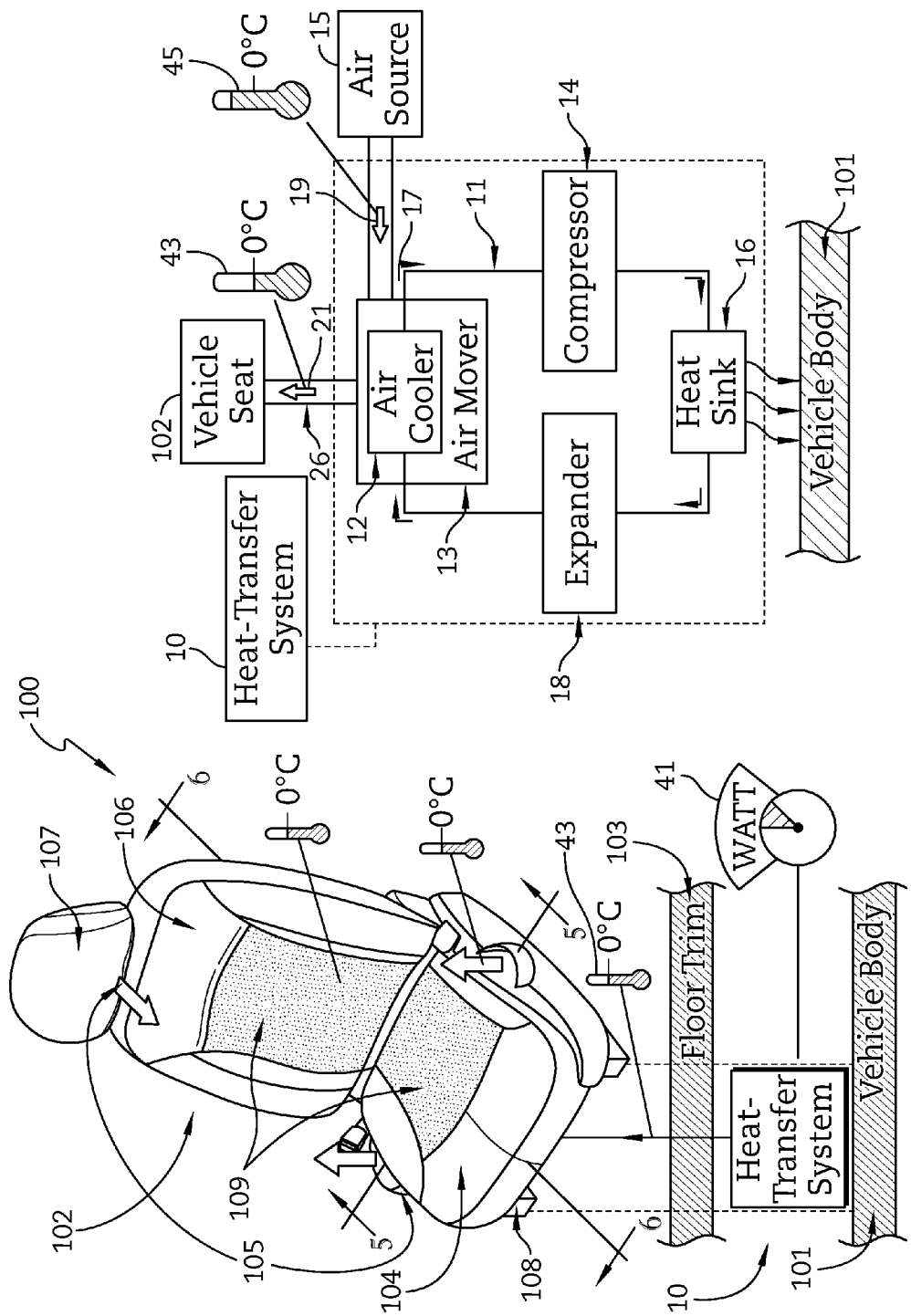

VEHICLE SEAT WITH THERMAL DEVICE

PRIORITY CLAIM

This application claims priority under 35 U.S.C. § 119(e) to U.S. Provisional Application No. 62/158,026, filed May 7, 2015, which is expressly incorporated by reference herein.

BACKGROUND

The present disclosure relates to a vehicle seat, and particularly to seat bottoms and seat backs of a vehicle seat. More particularly, the present disclosure relates to a cooling system configured to provide cooling air to the seat bottoms and seat backs of the vehicle seat.

SUMMARY

According to the present disclosure, a passenger restraint includes a vehicle seat and a foundation adapted to couple the seat to a vehicle frame included in a vehicle. The vehicle seat is adapted to support a passenger sitting thereon. The foundation couples the vehicle seat in spaced-apart relation to the vehicle frame to allow the vehicle seat to move back and forth relative to the vehicle frame.

In illustrative embodiments, the passenger restraint further includes a heat-transfer unit. The heat-transfer unit is positioned to lie in a space defined in part by the vehicle seat and the vehicle frame. The heat-transfer unit is configured to provide means for transferring heat from ambient air surrounding the vehicle seat to the vehicle frame using a closed-path flow of refrigerant to cause cooling air at about zero degrees Celsius to be provided to the vehicle seat to cause a cooling sensation to be provided to the occupant without cooling an entire cabin space formed in the vehicle so that a time to thermal sensation as felt by the occupant is minimized while an amount of power used to provide the cooling air is minimized and energy efficiency is maximized.

In illustrative embodiments, the heat-transfer unit is positioned to lie under the vehicle seat and between a pair of spaced-apart frame rails included in the foundation. The heat-transfer unit is further located between the vehicle frame and floor trim included in the vehicle. As a result, waste noise and heat generated by the heat-transfer unit and communicated to the occupant is minimized.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective and diagrammatic view of a passenger restraint in accordance with the present disclosure showing that the passenger restraint includes a vehicle seat and a heat-transfer system positioned below the vehicle seat and configured to provide cooling air at or below 0 degrees Celsius to the vehicle seat and suggesting that the heat-transfer system uses a low amount of energy to provide the cooling air to the vehicle seat;

FIG. 2 is a diagrammatic view of the heat-transfer system of FIG. 1 showing that the heat-transfer system includes, in clockwise order, an air mover including an air cooler for transferring heat from air surrounding the vehicle seat to a closed-path flow of refrigerant (solid single arrow) so that the cooling stream of air is provided to the vehicle seat, a compressor for compressing the closed-path flow of refrigerant, a heat sink for dissipating heat from the closed-path flow of refrigerant to a body of a vehicle, and an expander for expanding the closed-path flow of refrigerant to decrease the refrigerant's temperature before returning to the air cooler;

FIG. 3 is a perspective and diagrammatic view of the passenger restraint of FIG. 1 showing that that the heat-transfer system is located inside a perimeter defined by the vehicle seat and suggesting that the heat-transfer system is located between the vehicle body and floor trim included in the vehicle to minimize noise produced by the heat-transfer system;

FIG. 4 is a diagrammatic view of the heat-transfer system of FIGS. 1 and 2 showing how the closed-path flow of refrigerant changes in temperature (T), pressure (P), and phase state (S) as the refrigerant moves through the loop established by the air cooler, compressor, heat sink, and expander and showing that a condensation passageway is arranged to transfer condensate from the air cooler outside the vehicle;

FIG. 5 is a sectional view taken along line 5-5 of FIG. 1 showing that a seat bottom included in the vehicle seat is formed to include flow channels for moving the cooling air provided by the heat-transfer system to side vents included in the seat bottom for passing at least a portion of the cooling air out over a passenger sitting thereon and through a trim layer (XXXX) included in the seat bottom;

Figure 9:
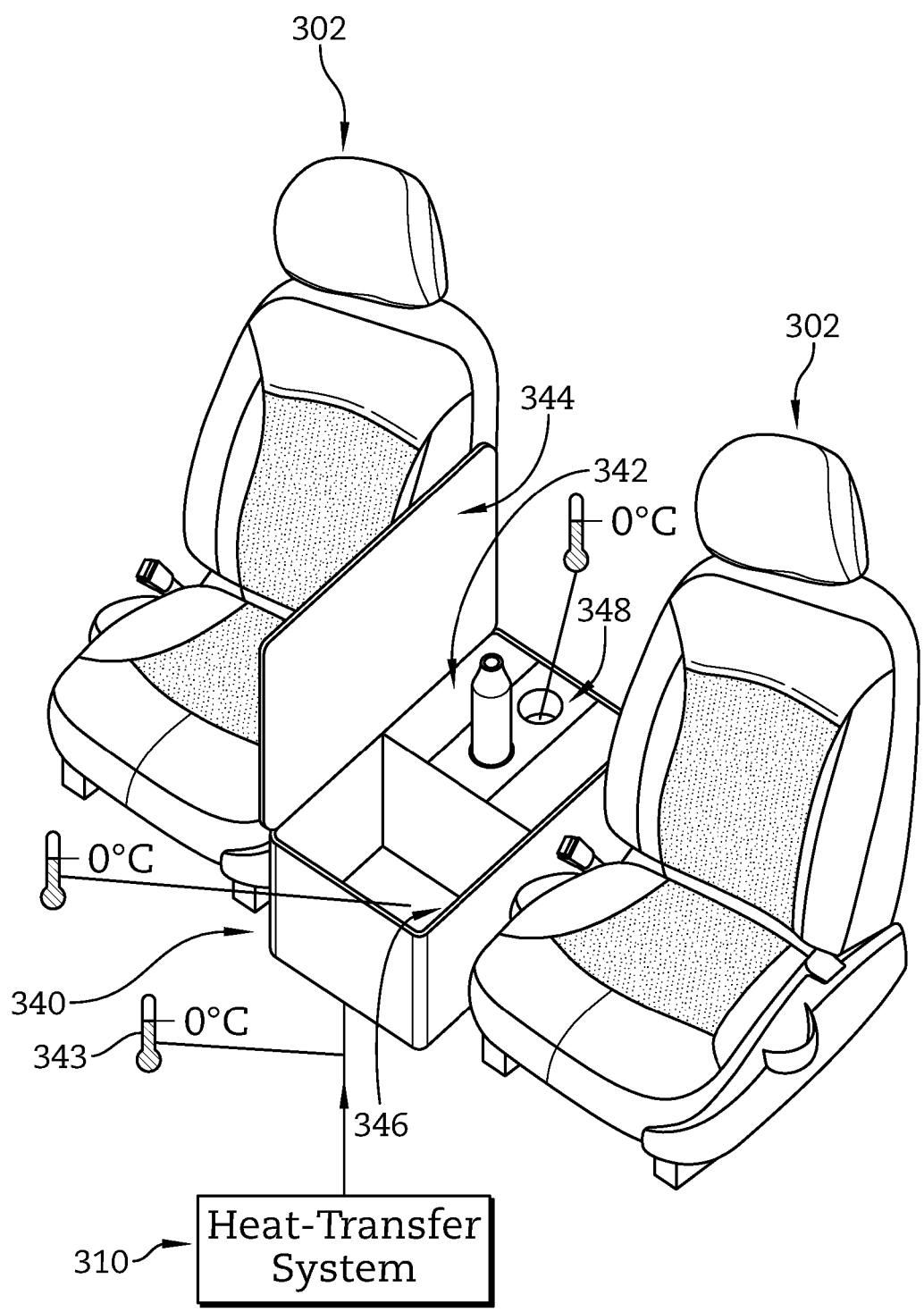
Figure 10:
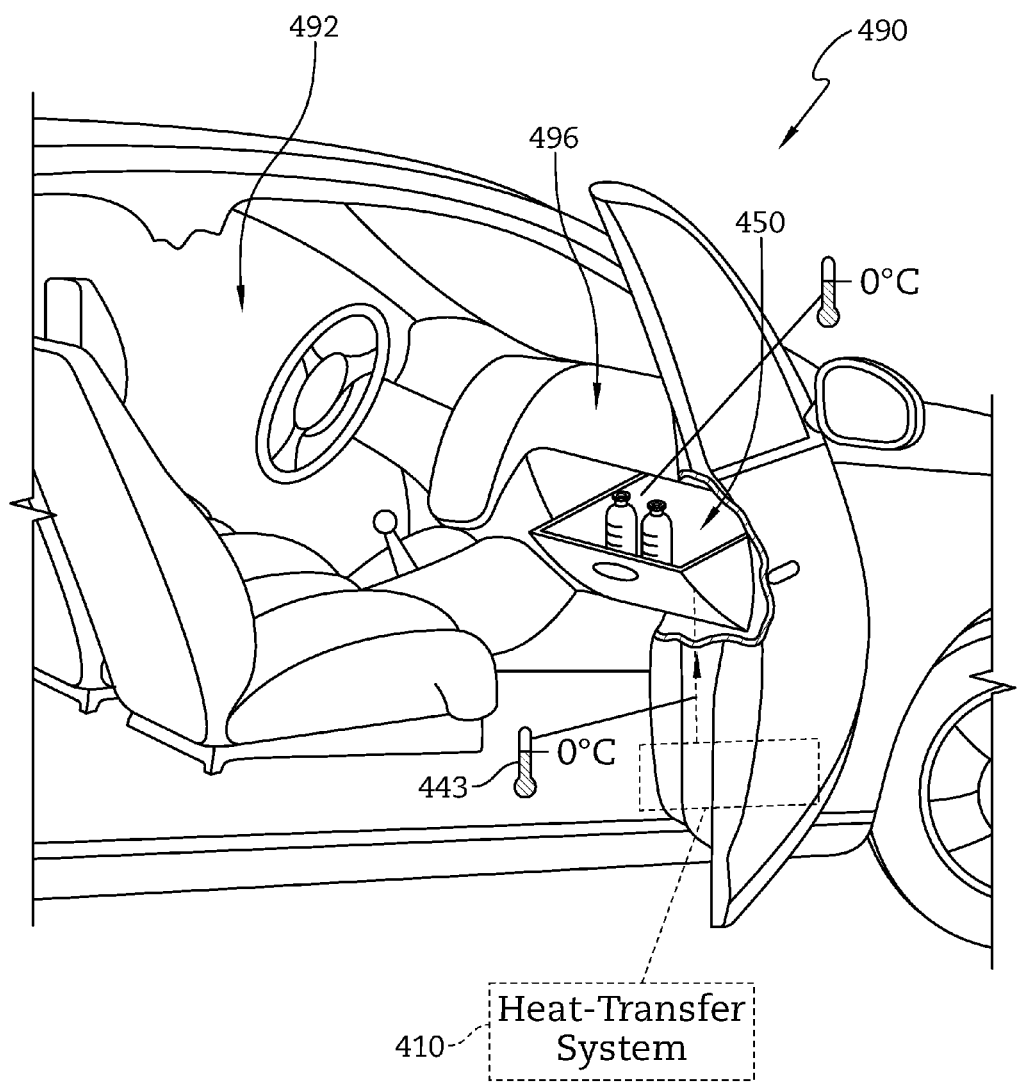
Figure 11:
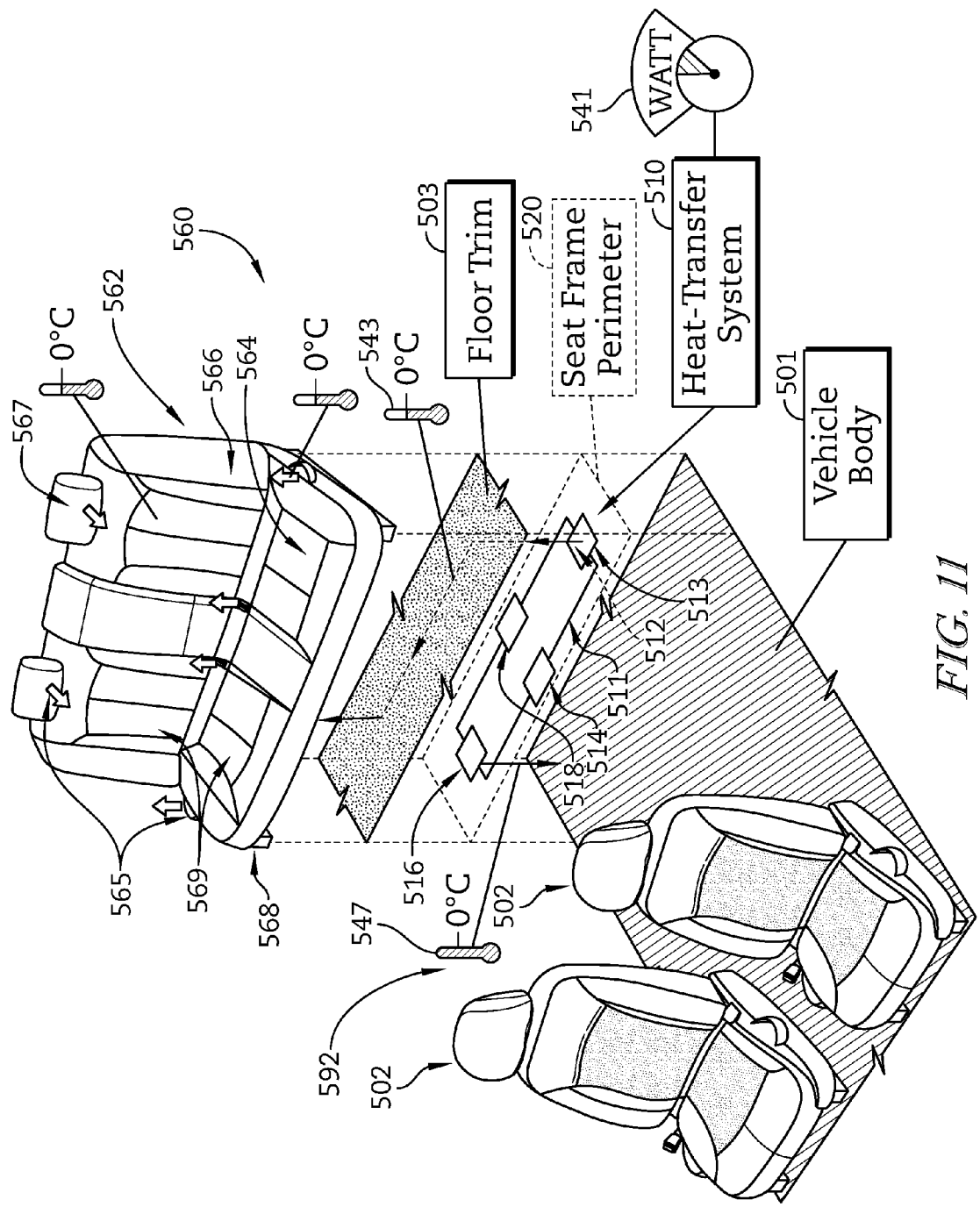
Figure 12:
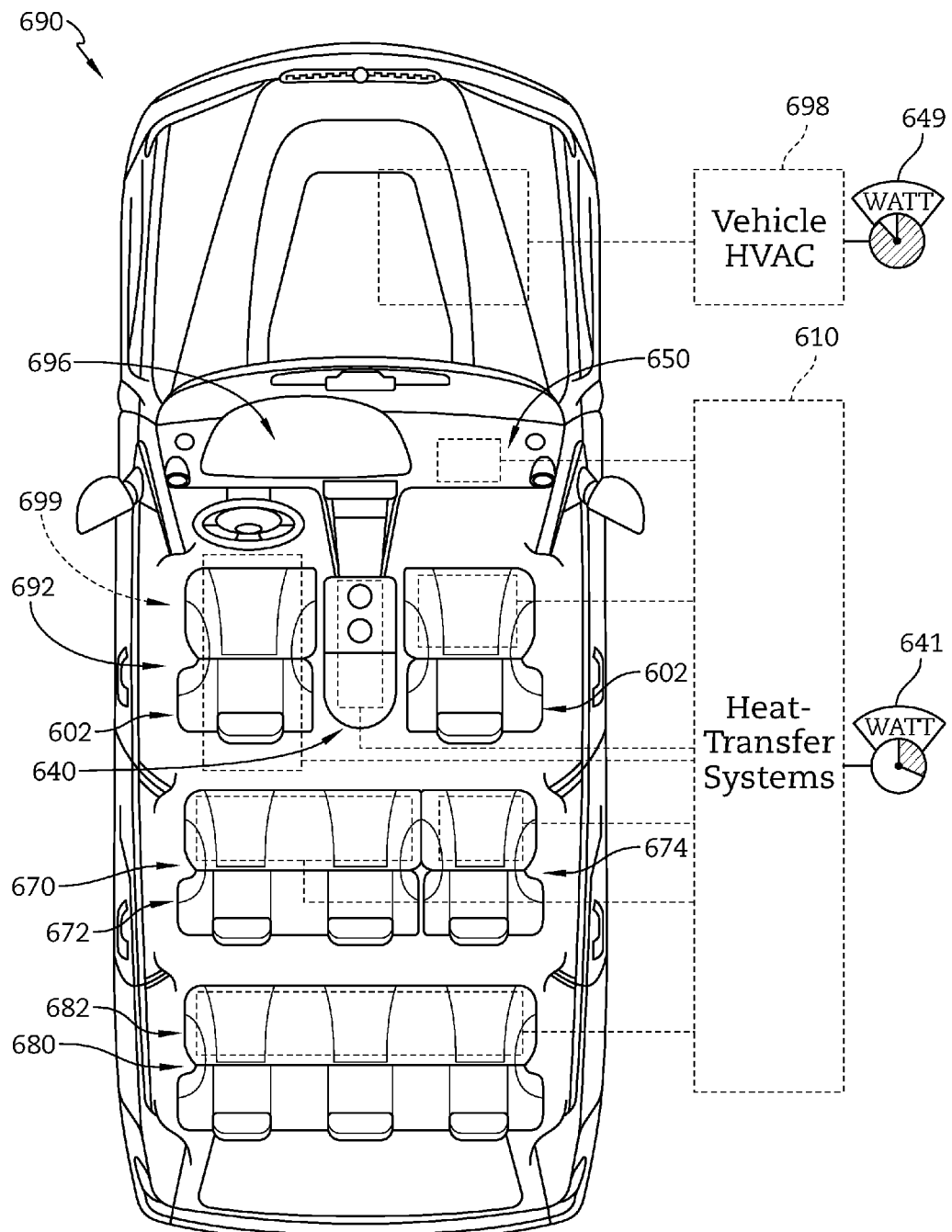

FIG. 9 is a perspective and diagrammatic view of a front row seating arrangement of a passenger vehicle showing that the front row seating arrangement includes two spaced-apart passenger seats and a storage cooler that is formed to include an armrest compartment positioned between the vehicle seats and a third embodiment of a heat-transfer system in accordance with the present disclosure positioned below the armrest compartment and configured to provide cooling air at or below 0 degrees Celsius to the armrest compartment to cool the contents, for example beverages in cup holders, in the armrest compartment;

FIG. 10 is a partial perspective view of a passenger vehicle showing a fourth embodiment of a heat-transfer system in accordance with the present disclosure that is located below a glove box included in the passenger vehicle and configured to provide cooling air at or below 0 degrees Celsius to the glove box to cool the contents of the glove box;

FIG. 11 is a perspective and diagrammatic view of a first row of vehicle seats and a second row passenger restraint in accordance with the present disclosure showing that the second row passenger restraint includes a vehicle-seat bench and a heat-transfer system positioned below the vehicle-seat bench and configured to provide cooling air at or below 0 degrees Celsius to the vehicle-seat bench; and FIG. 12 is a diagrammatic and top plan view of a passenger vehicle with the roof cut away to show a first row of passenger restraints, a second row of passenger restraints, and a third row of passenger restraints in accordance with the present disclosure and suggesting that the passenger vehicle includes one or more heat-transfer systems assuming various positions within the passenger vehicle.

DETAILED DESCRIPTION

Figure 3:
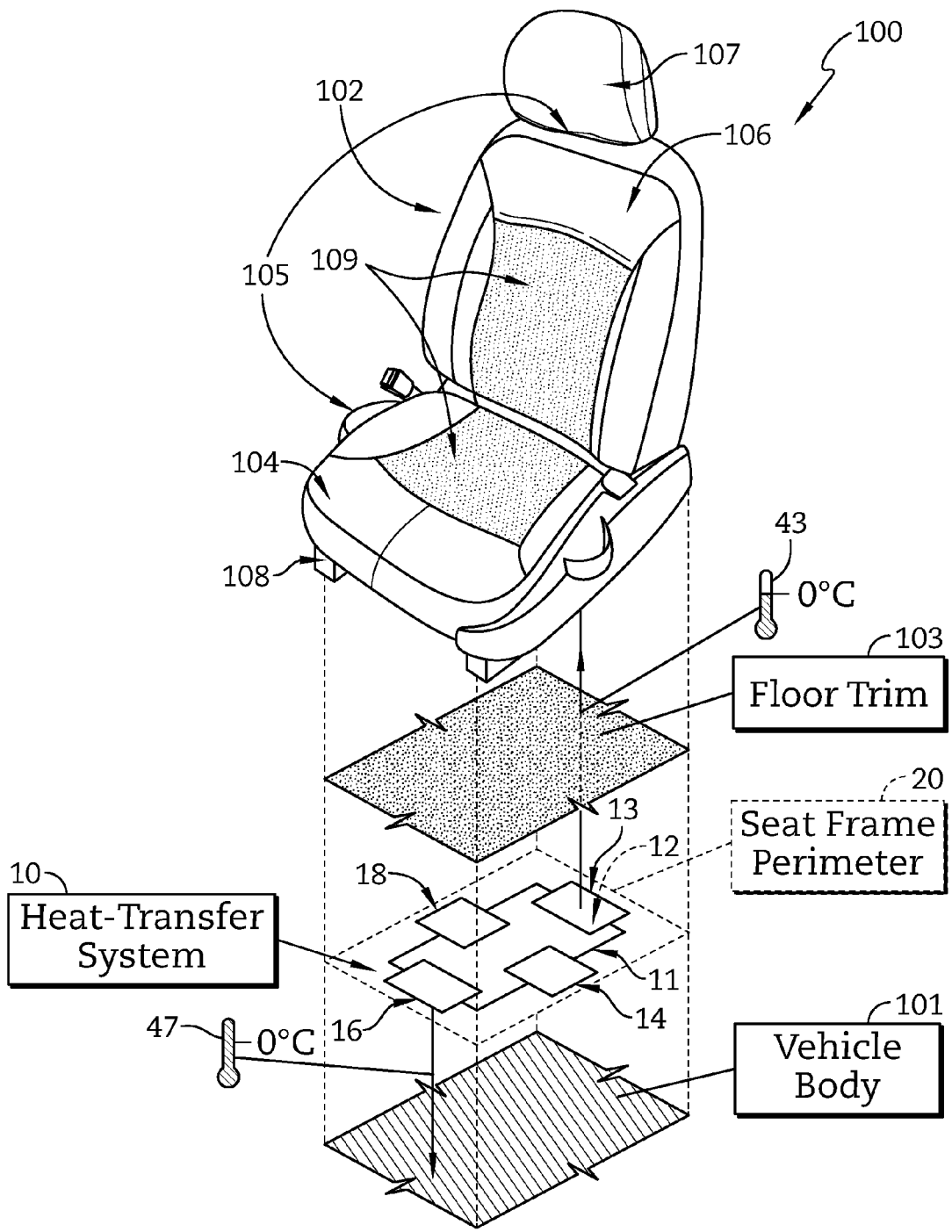
Figure 8:
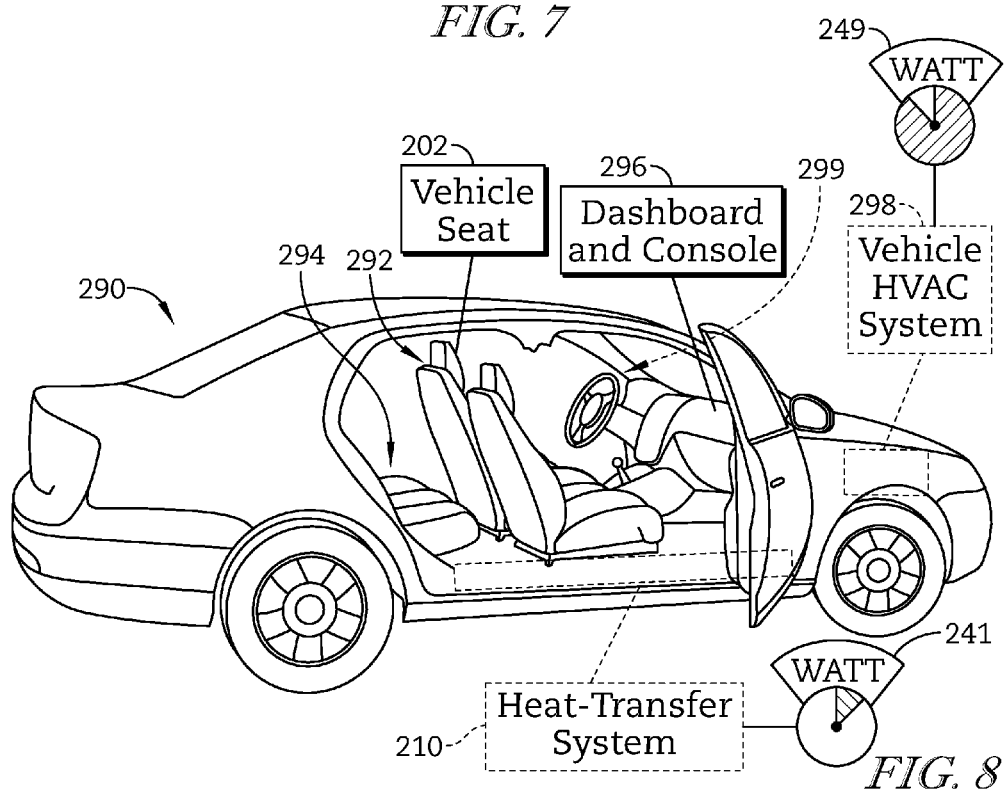
FIG. 8 is a partial perspective view of a vehicle showing a second embodiment of a heat-transfer system in accordance with the present disclosure that is located below the vehicle seat and arranged to extend beyond a perimeter defined by the vehicle seat and is separate from a vehicle HVAC system included in the vehicle.

A first embodiment of a passenger restraint 100 in accordance with the present disclosure is shown, for example, in FIGS. 1 and 3. Passenger restraint 100 includes a vehicle seat 102 and a heat-transfer system 10 configured to provide means for providing cooling air at or below about 0 degrees Celsius to vehicle seat 102 to cause an occupant sitting on vehicle seat 102 to experience a minimized time to thermal sensation while minimizing an amount of power used to provide the cooling air so that cooling is maximized and energy efficiency is maximized. A second embodiment of a heat-transfer system 210 in accordance with the present disclosure is shown in FIG. 8. A third embodiment of a heat-transfer system 310 in accordance with the present disclosure is shown in FIG. 9. A fourth embodiment of a heat-transfer system 410 in accordance with the present disclosure is shown in FIG. 10. A fifth embodiment of a heat-transfer system 510 in accordance with the present disclosure is shown in FIG. 11. A sixth embodiment of a heat-transfer system 610 in accordance with the present disclosure is shown in FIG. 12.

Passenger restraint 100 is shown in FIGS. 1 and 3. Passenger restraint 100 includes vehicle seat 102 and a first embodiment of heat-transfer system 10 positioned below vehicle seat 102. Vehicle seat 102 and heat-transfer system 10 are coupled to a vehicle body 101 (sometimes called a vehicle frame) of a passenger vehicle to travel therewith. Heat-transfer system 10 is configured to provide cooling air at or below 0 degrees Celsius to vehicle seat 102 as measured by a thermometer 43. However, the temperature may be adjustable at the selection of an occupant of the passenger vehicle. Heat transfer system 10 uses a low amount of power as measured by a watt meter 41 to provide the cooling air when compared to a HVAC system of the passenger vehicle as suggested in FIGS. 8 and 12.

Vehicle seat 102 includes a seat bottom 104, a seat back 106, and a headrest 107 as shown in FIG. 1. One or more vents 105 are coupled to seat bottom 104 and seat back 106 and are configured to pass the cooling air supplied by heat-transfer system 10 over the occupant of vehicle seat 102. Vehicle seat 102 also includes frame rails 108 which are positioned to support vehicle seat 102 and allow selective positioning of vehicle seat 102 relative to vehicle body 101 at the selection of the occupant of vehicle seat 102. Headrest 107 is coupled to seat back 106. Seat bottom 104 and seat back 106 are covered in a seat trim 109 which is configured to communicate at least a portion of the cooling air supplied by heat-transfer system 10 there through to cool seat trim 109.

Heat-transfer system 10 includes an air cooler 12, a compressor 14 coupled to air cooler 12, a heat sink 16 coupled to compressor 14, and an expander 18 coupled between heat sink 16 and air cooler 12 as shown in FIG. 2. A refrigerant flows through heat-transfer system 10 along a flow path 11 as suggested by arrows 17. How path 11 forms a closed-path flow of refrigerant which circulates through heat-transfer system 10.

Incoming air 19 has a temperature above 0 degrees Celsius as measured by a thermometer 45 in FIG. 2. Air cooler 12 is configured to transfer heat from incoming air 19 to the refrigerant flowing through flow path 11 so that a cooling stream of air 21 is provided to vehicle seat 102 at or below 0 degrees Celsius as measured by thermometer 43. Incoming air 19 has a higher temperature, as measured by a thermometer 45, than cooling stream of air 21, as measured by thermometer 43. Compressor 14 is configured to compress the refrigerant flowing through flow path 11. Heat sink 16 is configured to dissipate heat from the refrigerant flowing through flow path 11 to vehicle body 101. Expander 18 is configured to expand the refrigerant flowing through flow path 11 to decrease the refrigerant's temperature before returning to air cooler 12.

An air mover 13 is positioned to surround air cooler 12 to direct the incoming air 19 from an air source 15 around air cooler 12. In some embodiments, air source 15 is a fan moving air from an ambient environment surrounding vehicle seat 102 into heat-transfer system 10. In other embodiments, air source 15 is an air pump moving air from an ambient environment surrounding the passenger vehicle and incoming air 19 may pass through filter elements included in the HVAC system of the passenger vehicle.

In the illustrative embodiment, heat-transfer system 10 is positioned below a floor trim 103 of the passenger vehicle as shown in FIGS. 1 and 3. Floor trim 103 minimizes noise produced by heat-transfer system 10. Heat-transfer system 10 is sized and positioned to lie between frame rails 108 of vehicle seat 102 as suggested in FIG. 1. In some embodiments, heat-transfer system 10 is sized and positioned to lie within a seat frame perimeter 20 defined at least in part by frame rails 108 of vehicle seat 102 and seat bottom 104 as suggested in FIG. 3. The individual components of heat-transfer system 10 are sized to fit between seat bottom 104 and vehicle body 101 while maintaining sufficient thermal transfer capacity to transfer heat, as measured by a thermometer 47, from the refrigerant within flow path 11 to vehicle body 101 and to provide vehicle seat 102 with cooling stream of air 21.

Figure 4:
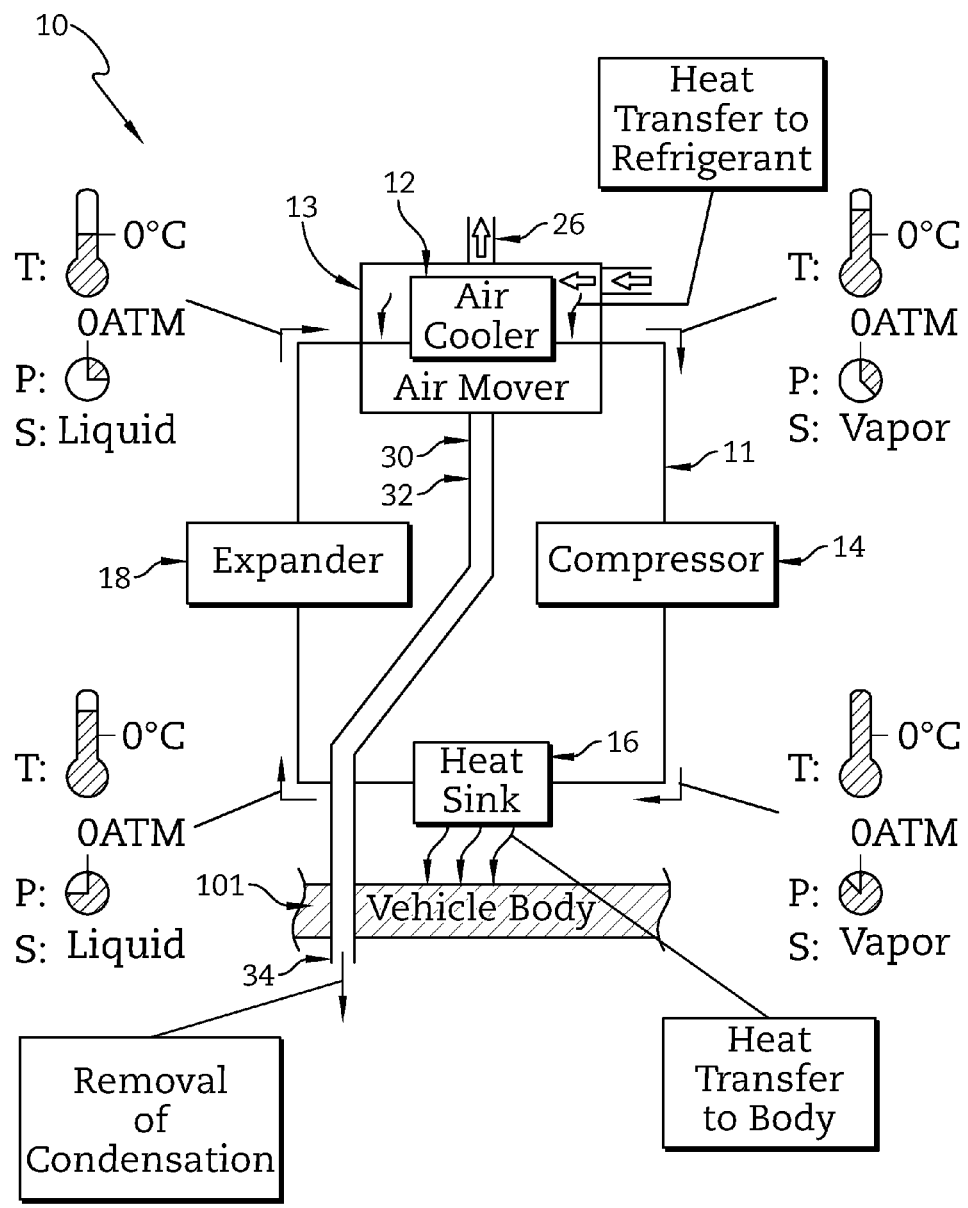

The refrigerant flowing through flow path 11 experiences temperature, pressure, and phase (vapor or liquid) changes as it moves through heat-transfer system 10 as suggested in FIG. 4. Incoming air 19 passes into air mover 13 and through air cooler 12 which transfers heat from the incoming air to the refrigerant flowing through flow path 11. The addition of heat increases the temperature and pressure of the refrigerant flowing through flow path 11 causing the refrigerant to enter a vapor phase.

Incoming air 19 has a temperature and a relative humidity. As incoming air 19 is cooled to become cooling stream 21, water vapor in incoming air 19 condenses on air cooler 12 to form condensation. The condensation is removed from air mover 13 by a condensation remover 30 as shown in FIG. 4. Condensation remover 30 includes an air-box conduit 32 coupled to air mover 13 and a vehicle frame conduit 34 coupled between air-box conduit 32 and vehicle frame 101. Condensation remover 30 forms a flow path for condensation between air mover 13 and an exterior environment of the passenger vehicle. In another example, a condensation mover may communicate condensation from the air mover to a tray or other container where the condensation is permitted to evaporate over time.

Refrigerant flowing through flow path 11 is compressed by compressor 14 further increasing the temperature and pressure of the refrigerant as shown in FIG. 4. In one example, compressor 14 is an Aspen 1.4 cc model compressor or Aspen 1.9 cc model compressor available from Aspen Compressor of Marlborough, Md., USA. Heat sink 16 transfers heat from the refrigerant flowing through flow path 11 to vehicle body 101. Heat transferred to vehicle body 101 is transferred to the ambient environment surrounding the passenger vehicle. Heat transfer from the refrigerant flowing through flow path 11 lowers the temperature and pressure of the refrigerant and causes a phase change from vapor to liquid. The refrigerant flowing through flow path 11 is expanded by expander 18 to further lower the temperature and pressure of the refrigerant before returning to air cooler 12.

Figure 5:
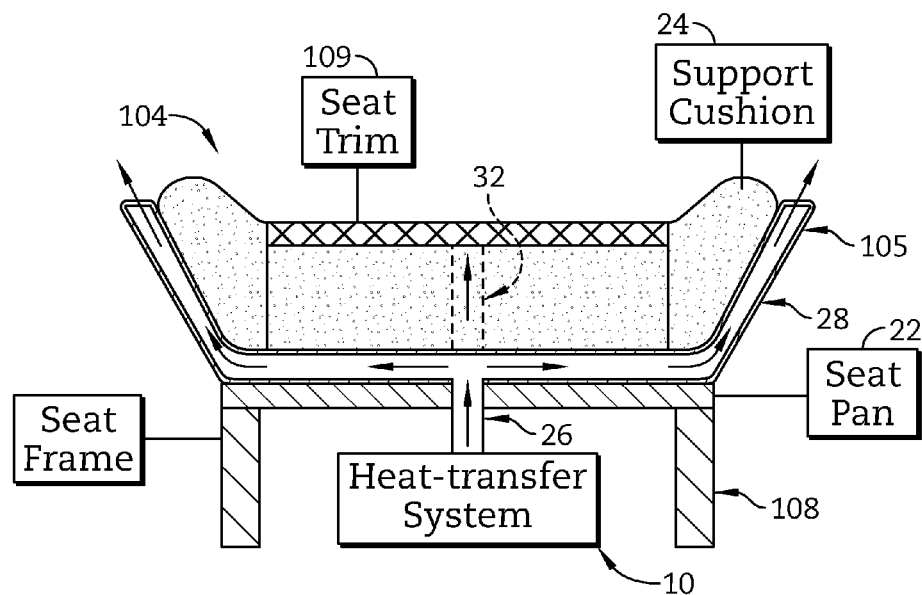

Seat bottom 104 includes a support cushion 24 coupled to a seat pan 22 as shown in FIG. 5. Seat pan 22 is coupled to frame rails 108 and includes a cooling-air conduit 26 for passing cooling stream of air 21 supplied by heat-transfer system 10 through seat pan 22 and into seat bottom 104. Seat bottom 104 also includes vent-flow passageways 28 for supplying vents 105 coupled to sides of seat bottom 104 with cooling air from heat-transfer system 10. Cooling stream of air 21 passes through a trim-flow passageway 32 to supply seat trim 109 with cooling air.

Figure 6:
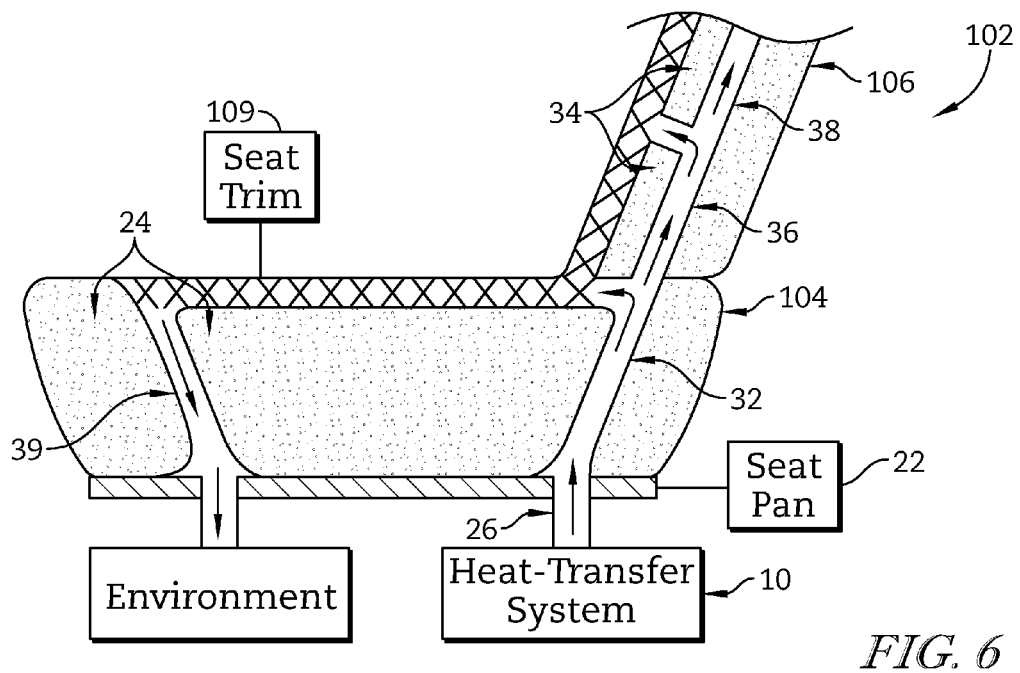
FIG. 6 is a sectional view taken along line 6-6 of FIG. 1 showing that a portion of the cooling air flows through the trim layer of the seat bottom and another portion of the cooling air flows up into a seat back included in the vehicle seat and passes through a trim layer (XXXX) included in the seat back.

Seat back 106 includes a support cushion 34 coupled to a seat-back frame (not shown), a trim-flow passageway 36, and a vent-flow passageway 38 as shown in FIG. 6. Cooling stream of air 21 supplied by heat-transfer system 10 passes through trim-flow passageway 36 to supply seat trim 109 coupled to seat back 106 with cooling air. Cooling stream of air 21 also passes through vent-flow passageway 38 to supply vents 105 coupled to seat back 106 with cooling air. In the illustrative embodiment, cooling air flowing through seat trim 109 passes to an exit-flow passageway 39 and exits from seat bottom 104 to an ambient environment surrounding vehicle seat 102.

Figure 7:
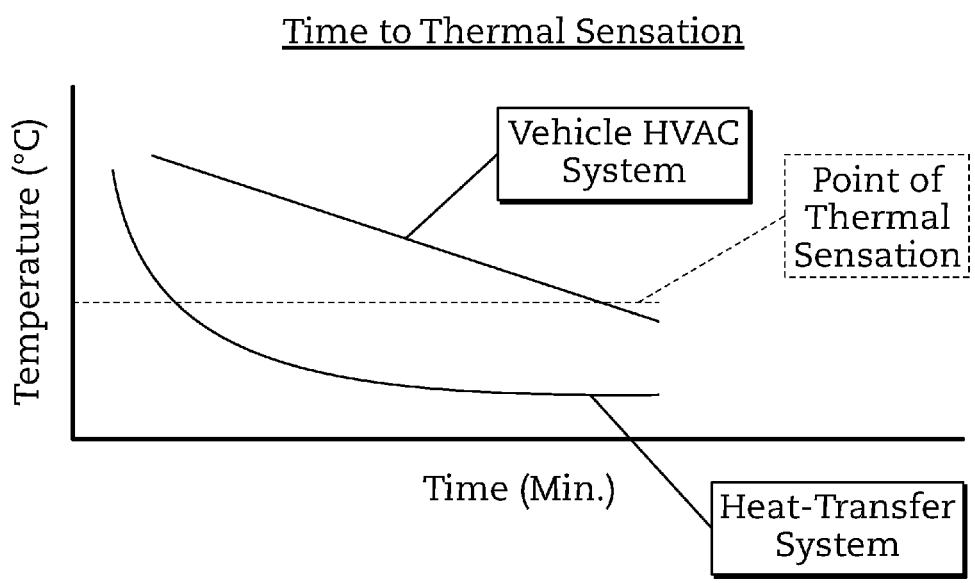
FIG. 7 is a graph showing a time to thermal sensation as felt by an occupant sitting in the vehicle seat of FIG. 1 from an HVAC system of the vehicle and from the heat-transfer system included in the passenger restraint of FIG. 1 and suggesting that the heat-transfer system of the passenger restraint provides a faster time to thermal sensation to the occupant than the HVAC system.

Heat-transfer system 10 operates to provide a thermal sensation to the occupant of passenger restraint 100 in a shorter period of time than the HVAC system of the passenger vehicle as suggested in FIG. 7. The HVAC system operates to cool large volumes of air which are supplied via dashboard and cabin vents to lower the temperature of an environment within a cabin of the passenger vehicle. This occurs over an extended period of time due to the amount of air being cooled. In contrast, heat-transfer system 10 operates to cool smaller volumes of air which are provided to an individual vehicle seat within the passenger vehicle, such as vehicle seat 102. The smaller volume of air and individualized flow allows heat-transfer system 10 to provide a thermal sensation to the occupant faster than the HVAC system. Furthermore, heat-transfer system 10 uses less power to cool an occupant sitting on passenger restraint 100 in less time than the vehicle HVAC system.

In a second illustrative embodiment, a passenger vehicle 290 includes a first row of seats 292 including two vehicle seats 202 and a second row of seats 294 positioned behind first row of vehicle seats 292 as shown in FIG. 8. Passenger vehicle 290 also includes a dashboard and console 296 positioned forward of first row of seats 292. A vehicle HVAC system 298 is positioned at a front of passenger vehicle 290, for example, in a motor compartment of the vehicle. Vehicle HVAC system 298 operates to cool an environment within a cabin 299 of passenger vehicle 290.

A heat-transfer system 210 is also included in passenger vehicle 290 as shown in FIG. 8. Heat-transfer system 210 is positioned below first row of seats 292 as shown in FIG. 8. Heat-transfer system 210 may include similar components to heat-transfer system 110. However, the components of heat-transfer system 210 may lie in a variety of positions as suggested in FIG. 8. For example, heat-transfer system 210 may be positioned to lie in a space defined by first row of seats 292. Heat-transfer system 210 may be positioned to lie in a space defined by dashboard and console 296. Heat-transfer system 210 may be positioned below first row of seats 292 and extend forward, rearward, or forward and rearward of first row of seats 292. Heat-transfer system 210 is separate from and in spaced-apart relation to vehicle HVAC system 298 as shown in FIG. 8. Heat-transfer system 210 may operate to provide a cooling stream of air 221 to first row of seat 292, second row of seats 294, or both. As shown in FIG. 8, vehicle HVAC system 298 uses more power, as measured by a watt meter 249, than heat-transfer system 210, as measured by a watt meter 241. In one example, watt meter 249 measures about 6 kilowatts to about 9 kilowatts while watt meter 241 measures about 100 watts. The 100 watts measured for heat-transfer system is about 25 watts for a fan and about 75 watts for the compressor.

In a third illustrative embodiment, an armrest 340 is positioned between a pair of vehicle seats 302 in a passenger vehicle as shown in FIG. 9. Armrest 340 includes a chiller 342 and a heat-transfer system 310 coupled to chiller 342. A lid 344 is coupled to chiller 344 to rotate between an open position in which access to a cold-storage compartment 346 is allowed as shown in FIG. 9 and a closed position to support items thereon. In some embodiments, armrest 340 and seats 302 are part of a first row of seats in the passenger vehicle. In other embodiments, armrest 340 and seats 302 are part of a second or third row of seats in the passenger vehicle.

Chiller 342 is formed to include cold-storage compartment 346 and a beverage cooler 348 as shown in FIG. 9. Cold-storage compartment 346 is configured to store items placed in cold-storage compartment 346 at below ambient temperatures. Beverage cooler 348 is configured to cool beverages placed in beverage cooler 348. In the illustrative embodiment, heat-transfer system 310 is configured to maintain a temperature of cold-storage compartment 346 and beverage cooler 348 at or below 0 degrees Celsius. The temperature of cold-storage compartment 346 and beverage cooler 348 may be adjustable at the selection of an occupant of the passenger vehicle. In some embodiments, an evaporator of heat-transfer system 310 may be positioned proximate to cold-storage compartment 346 and beverage cooler 348. The evaporator may be configured to receive refrigerant from heat-transfer system 310 at or below 0 degrees Celsius, as measured by a thermometer 343, to cool the contents of cold-storage compartment 346 and beverage cooler 348.

In a fourth illustrative embodiment, a passenger vehicle 490 includes a first row of vehicle seats 492 and a dashboard and console 496 as shown in FIG. 10. Dashboard and console 496 includes a glove box 450 and a heat-transfer system 410 coupled to glove box 450. Glove box 450 is mounted for rotation between an open position providing access to a storage space formed in glove box 450 as shown in FIG. 10 and a closed position blocking access to the storage space.

Glove box 450 is configured to store items, for example beverages, placed in glove box 450 at below ambient temperatures as suggested in FIG. 10. In the illustrative embodiment, heat-transfer system 410 is configured to maintain a temperature of glove box 450 at or below 0 degrees Celsius. The temperature of glove box 450 may be adjustable at the selection of an occupant of passenger vehicle 490. In some embodiments, an evaporator of heat-transfer system 410 may be positioned proximate to glove box 450. The evaporator may be configured to receive refrigerant from heat-transfer system 410 at or below 0 degrees Celsius, as measured by a thermometer 443, to cool the contents of glove box 450.

In a fifth illustrative embodiment, a passenger vehicle includes a first row of vehicle seats 592 and a second row passenger restraint 560 as shown in FIG. 11. First row of vehicle seats 592 includes a pair of vehicle seats 502. Passenger restraint 560 includes a vehicle-seat bench 562 and a heat-transfer system 510 positioned below vehicle-seat bench 562. Vehicle-seat bench 562 and heat-transfer system 510 are coupled to a vehicle body 501 of the passenger vehicle to travel therewith. Heat-transfer system 510 is configured to provide cooling air at or below 0 degrees Celsius, as measured by a thermometer 543, to vehicle-seat bench 562. The temperature may be adjustable at the selection of an occupant of the passenger vehicle. Heat transfer system 510 uses a low amount of power, as measured by a watt meter 541, to provide the cooling air when compared to a HVAC system of the passenger vehicle as suggested in FIGS. 8 and 12.

Vehicle-seat bench 562 includes a bench bottom 564, a bench back 566, and headrests 567 as shown in FIG. 11. One or more vents 565 are coupled to bench bottom 564 and bench back 566 and are configured to pass the cooling air supplied by heat-transfer system 510 over the occupant(s) of vehicle-seat bench 562. Vehicle-seat bench 562 also includes frame rails 568 which are positioned to support vehicle-seat bench 562 on vehicle body 501. Seat bottom 564 and seat back 566 are covered in a seat trim 569 which is configured to communicate at least a portion of the cooling air supplied by heat-transfer system 510 there through to cool seat trim 569.

Heat-transfer system 510 includes an air cooler 512, a compressor 514 coupled to air cooler 512, a heat sink 516 coupled to compressor 514, and an expander 518 coupled between heat sink 516 and air cooler 512 as shown in FIG. 11. A refrigerant flows through heat-transfer system 510 along a flow path 511. Flow path 511 forms a closed-path flow of refrigerant which circulates and recirculates through heat-transfer system 510.

Air cooler 512 is configured to transfer heat from incoming air to the refrigerant flowing through flow path 511 so that a cooling stream of air is provided to vehicle-seat bench 562 as suggested in FIG. 11. Compressor 514 is configured to compress the refrigerant flowing through flow path 511. Heat sink 516 is configured to dissipate heat from the refrigerant flowing through flow path 511 to vehicle body 501, as measured by a thermometer 547. Expander 518 is configured to expand the refrigerant flowing through flow path 511 to decrease the refrigerant's temperature before returning to air cooler 512. An air mover 513 is positioned to surround air cooler 512 to direct the incoming air around air cooler 512.

In the illustrative embodiment, heat-transfer system 510 is positioned below a floor trim 503 of the passenger vehicle as shown in FIG. 11. Floor trim 503 minimizes noise produced by heat-transfer system 510. Heat-transfer system 510 is sized and positioned to lie between frame rails 568 of vehicle-seat bench 562. In some embodiments, heat-transfer system 510 is sized and positioned to lie within a seat frame perimeter 520 defined at least in part by frame rails 568 of vehicle-seat bench 562 and bench bottom 564 as suggested in FIG. 11. The individual components of heat-transfer system 510 are sized to fit between seat bottom 564 and vehicle body 501 while maintaining sufficient thermal transfer capacity to transfer heat from the refrigerant within flow path 511 to vehicle body 501 and to provide vehicle-seat bench 562 with a cooling stream of air.

In a sixth illustrative embodiment, one or more heat-transfer systems 610 are positioned at various locations throughout a cabin 699 of a passenger vehicle 690 as shown in FIG. 12. Passenger vehicle 690 includes first row seating 692, second row seating 670, and third row seating 680. First row seating 692 includes an armrest 640 positioned between a pair of vehicle seats 602. Second row of seating 670 includes a two-cushion bench 672 and a single-cushion bench 674. Two-cushion bench 672, single-cushion bench 674, or both are configured to fold to allow a passenger to enter passenger vehicle 690 and enter third row seating 680. Third row seating 680 includes a three-cushion bench 682.

Passenger vehicle 690 also includes a dashboard and console 696 which is formed to include a glove box 650 as shown in FIG. 12. A vehicle HVAC system 698 is positioned at a front of passenger vehicle 690, for example in a motor compartment of the vehicle. Vehicle HVAC system 698 operates to cool an environment within cabin 699 of passenger vehicle 690. Vehicle HVAC system 698 uses more power, as measured by a watt meter 649, than one or more of heat-transfer systems 610 distributed throughout passenger vehicle 690, as measure by a watt meter 641. Exemplary locations and orientations for the various heat-transfer systems 610 are shown in phantom. Additionally, heat-transfer systems 610 may be positioned at some or all of the locations and in any combination.

The heat-transfer systems in accordance with the present disclosure use a low amount of power when compared to HVAC systems of passenger vehicles. For example, heat-transfer system 210 uses a small percentage, about 4% to about 15%, of the power used by vehicle HVAC system 298 as measured by watt meters 241, 249 in FIG. 8. As another example, multiple heat-transfer systems 610 positioned throughout passenger vehicle 690 use less power combined than used by vehicle HVAC system 698 as measured by watt meters 641, 649 in FIG. 12.

Ambient air is cooled to low temperature by passing over an evaporator of a micro air conditioner. The micro air conditioner uses a refrigeration (Carnot) cycle and has very high efficiency, thereby optimizing the generation of conditioned (temperature and humidity) air. The conditioned air is passed through layers of the seat trim or a gap directly under the trim cover material that is in contact with a seat occupant. Vehicle power consumption is optimized by delivering cooling directly to occupied seats—personalized cooling vented to the seat surface.

The lower temperatures achieved by the Carnot cycle takes both moisture out of the air and provides much cooler air. This dry cooler air overcomes temperature loss from passage through the seat ducting and trim cover. It provides quick cooling on the seat surface and improved time to thermal sensation and time to comfort in high ambient temperature environments.

As compared to the vehicle HVAC system, the micro air conditioner unit has higher efficiency and can reach very low temperatures. Measures are taken to address condensation. For example, a drain tube could be provided to eliminate condensation from the cabin. Condensation can be drained outside the vehicle, or collected in an evaporation tray or medium. Measures are also taken to eliminate heat and noise produced by the compressor. For example, the micro compressor provides unique packaging opportunities under the carpet where the noise and heat can be absorbed (through a heat sink) by the seat frame, car body, or radiated external to the vehicle.

The small-scale refrigeration system includes a compressor, an evaporator, an air mover with conditioned air ducting, a condenser, and a pressure throttling valve (or expander). A vapor-compression cycle is used with these components and a refrigerant is used as the working fluid. The components are sized such that the entire system can be incorporated within a well-defined form factor attached to a vehicle seat frame. Waste heat produced by the vapor-compression cycle could be distributed to metal components of the vehicle and or seat frame structure. The condenser could be located below the carpet or outside of the cabin insulation.

The evaporator and condenser may contain micro channels to efficiently transfer heat to and from the refrigerant. The micro compressor cools the evaporator coils to sub-zero temperature and an air mover, such as a blower, moves ambient air over the evaporator coils to cool the incoming air to sub-zero temperature. The cold air may be ducted though a small tubing inside the seat. The seat may have an air permeable spacer under the trim cover, directly cooling the inner surface of the trim and the outer surface in contact with the occupant. The cool air is also passed to side bolsters and around the neck to ventilate around the body of occupant.

The micro air conditioner could be positioned in a front seat, a second row, or other rows. The system could also be used in arm rest refrigeration or other applications where cooling or freezing would be desired.

The invention claimed is:

1. A passenger restraint comprising
   a vehicle seat adapted to support a passenger sitting thereon,
   a foundation adapted to couple the seat to a vehicle frame included in a vehicle in spaced-apart relation to the vehicle frame to allow the vehicle seat to move back and forth relative to the vehicle frame, and
   a heat-transfer unit positioned to lie in a space defined in part by the vehicle seat and the vehicle frame and configured to provide means for transferring heat from ambient air surrounding the vehicle seat to the vehicle frame using a closed-path flow of refrigerant so that a cooling sensation is provided to the occupant in a minimized amount of time.

2. The passenger restraint of claim 1, wherein the heat-transfer unit is positioned to lie under the vehicle seat.

3. The passenger restraint of claim 2, wherein the foundation includes a pair of spaced-apart frame rails and the heat-transfer unit is positioned to lie between the frame rails.

4. The passenger restraint of claim 3, wherein the heat-transfer unit extends out of the space.

5. The passenger restraint of claim 4, wherein the vehicle seat includes a seat bottom coupled to the frame rails and a seat back coupled to the seat bottom to extend away from the seat bottom and the frame rails, the seat bottom including a perimeter edge arranged to extend around the seat bottom, and the heat-transfer unit is arranged to extend beyond the perimeter edge of the seat bottom.

6. The passenger restraint of claim 1, wherein the heat-transfer unit includes a cooling-air supply configured to transfer heat from the ambient air to the closed path flow of refrigerant to provide a cooling stream of air having a lower-than-ambient temperature to the vehicle seat, a compressor coupled fluidly to the cooling-air supply to increase a pressure of the closed path flow of refrigerant, a heat sink coupled fluidly to the compressor to transfer heat from the closed path flow of refrigerant to the vehicle frame, and an expander coupled fluidly between the heat sink and cooling-air supply to decrease pressure of the closed path flow of refrigerant and form the closed path of refrigerant included in the heat-transfer unit.

7. The passenger restraint of claim 6, wherein the cooling-air supply includes an air cooler coupled fluidly between the expander and compressor and configured to transfer heat from the ambient air to refrigerant passing through the air cooler and an air mover configured to move ambient air through the air cooler.

8. A passenger restraint comprising
   a vehicle seat adapted to support a passenger sitting thereon,
   a foundation adapted to couple the seat to a vehicle frame included in a vehicle in spaced-apart relation to the vehicle frame to allow the vehicle seat to move back and forth relative to the vehicle frame, and
   a heat-transfer unit positioned to lie in a space defined in part by the vehicle seat and the vehicle frame and configured to provide means for transferring heat from ambient air surrounding the vehicle seat to the vehicle frame using a closed-path flow of refrigerant so that a cooling sensation is provided to the occupant in a minimized amount of time,
   wherein the heat-transfer unit includes a cooling-air supply configured to transfer heat from the ambient air to the closed path flow of refrigerant to provide a cooling stream of air having a lower-than-ambient temperature to the vehicle seat, a compressor coupled fluidly to the cooling-air supply to increase a pressure of the closed path flow of refrigerant, a heat sink coupled fluidly to the compressor to transfer heat from the closed path flow of refrigerant to the vehicle frame, and an expander coupled fluidly between the heat sink and cooling-air supply to decrease pressure of the closed path flow of refrigerant and form the closed path of refrigerant included in the heat-transfer unit,
   wherein the cooling-air supply includes an air cooler coupled fluidly between the expander and compressor and configured to transfer heat from the ambient air to refrigerant passing through the air cooler and an air mover configured to move ambient air through the air cooler,
   wherein the air mover includes an air box arranged to surround the air cooler, an inlet arranged to extend between and interconnect the air box to a source of ambient air, and an outlet arranged to extend between and interconnect the air box and the vehicle seat to cause the cooling stream to be communicated from the air box to the vehicle seat.

9. The passenger restraint of claim 8, wherein the air mover further includes a condensation remover coupled to the air box and configured to collect condensation formed on the air cooler and transport the condensation outside of the air box.

10. The passenger restraint of claim 9, wherein the condensation remover is configured to provide means for transferring the condensation from the air box through the vehicle frame to an environment surrounding the vehicle frame.

11. A passenger restraint comprising
    a vehicle seat adapted to support a passenger sitting thereon, a foundation adapted to couple the seat to a vehicle frame included in a vehicle in spaced-apart relation to the vehicle frame to allow the vehicle seat to move back and forth relative to the vehicle frame, and a heat-transfer unit positioned to lie in a space defined in part by the vehicle seat and the vehicle frame and configured to provide means for transferring heat from ambient air surrounding the vehicle seat to the vehicle frame using a closed-path flow of refrigerant so that a cooling sensation is provided to the occupant in a minimized amount of time, wherein the heat-transfer unit includes a cooling-air supply configured to transfer heat from the ambient air to the closed path flow of refrigerant to provide a cooling stream of air having a lower-than-ambient temperature to the vehicle seat, a compressor coupled fluidly to the cooling-air supply to increase a pressure of the closed path flow of refrigerant, a heat sink coupled fluidly to the compressor to transfer heat from the closed path flow of refrigerant to the vehicle frame, and an expander coupled fluidly between the heat sink and cooling-air supply to decrease pressure of the closed path flow of refrigerant and form the closed path of refrigerant included in the heat-transfer unit, wherein the cooling-air supply includes an air cooler coupled fluidly between the expander and compressor and configured to transfer heat from the ambient air to refrigerant passing through the air cooler and an air mover configured to move ambient air through the air cooler, wherein the vehicle seat includes a seat pan coupled to the frame rails, a support cushion coupled to the seat pan and positioned to support a user on the vehicle seat, and a seat trim positioned to surround the support cushion and a first portion of the cooling stream of air moves between the seat trim and the support cushion.

12. The passenger restraint of claim 11, wherein the vehicle seat further includes one or more vents formed in the vehicle seat and arranged in fluid communication with the heat-transfer unit to transfer a second portion of the cooling stream over an occupant supported by the vehicle seat.

* * * * *